No. 802,392. PATENTED OCT. 24, 1905.
E. W. HAWLEY.
SPRING FASTENER FOR TRUNKS, &c.
APPLICATION FILED MAR. 9, 1904.
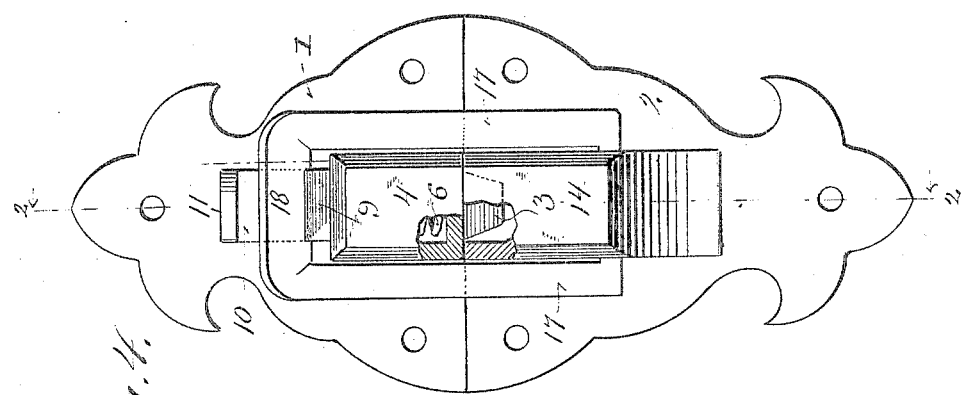
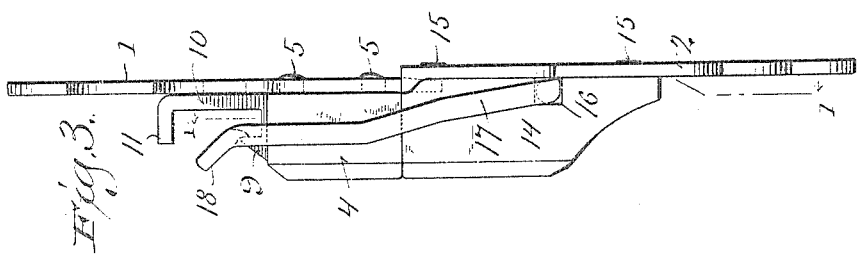
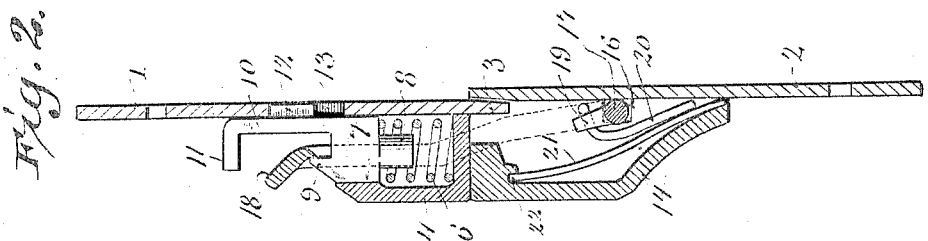
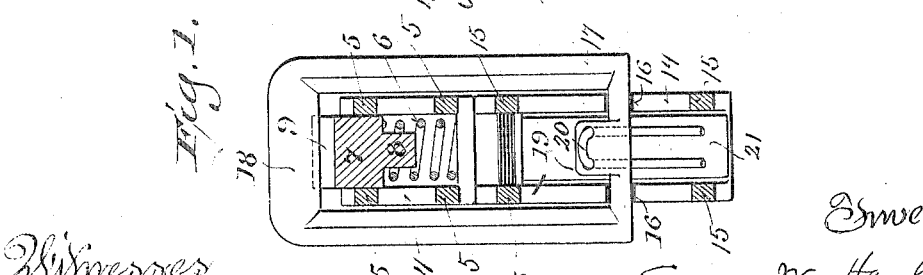
Witnesses
Geo. W. Young
Hugo Fahl
Inventor
Eugene W. Hawley
By H. G. Underwood
Attorneys

UNITED STATES PATENT OFFICE.

EUGENE W. HAWLEY, OF MILWAUKEE, WISCONSIN.

SPRING-FASTENER FOR TRUNKS, &c.

No. 802,392.   Specification of Letters Patent.   Patented Oct. 24, 1905.

Application filed March 9, 1904. Serial No. 197,379.

*To all whom it may concern:*

Be it known that I, EUGENE W. HAWLEY, a citizen of the United States, and a resident of Milwaukee, in the county of Milwaukee and State of Wisconsin, have invented certain new and useful Improvements in Spring-Fasteners; and I do hereby declare that the following is a full, clear, and exact description thereof.

My invention has especial reference to that class of spring-fasteners which are used on trunks, suit-cases, and like receptacles; and it consists in certain peculiarities of construction and combination of parts, as will be fully set forth hereinafter in connection with the accompanying drawings and subsequently claimed.

In the said drawings, Figure 1 is an interior elevation of a portion of my device, partly in section, on the plane indicated by the line 1 1 in Fig. 3. Fig. 2 is a vertical sectional view taken on the plane indicated by the line 2 2 in Fig. 4. Fig. 3 is a side elevation of my said device. Fig. 4 is a view in front elevation, partially broken away to better illustrate certain details of construction.

Referring by numerals to the said drawings, 1 represents the upper, and 2 the lower, plate secured, respectively, to the cover and body of the trunk, suit-case, or other receptacle, the upper plate 1 having a central depending tongue 3, which slips down in front of the lower plate 2 when the two plates are brought together by closing the cover of the receptacle to which they are attached.

4 is a housing attached to the upper plate 1, preferably by means of lugs 5 5 on said housing, which are passed through holes in the said plate and then upset. Within this housing 4 is a spiral spring 6, which rests on the bottom plate of the housing, whose top is open for the reception of a vertically-moving slide-block 7, which latter has a depending central lug 8, which fits within the coils of the spring 6, as shown in Figs. 1 and 2. The slide-block is formed with an upward-projecting catch 9 and the upward-projecting shank 10 of a thumb-piece 11. The rear side of the shank 10 is provided with a guide-lug 12, which has movement in a slot 13 in the plate 1.

14 designates a housing secured to the lower plate 2, preferably by means of lugs 15 15, extended through holes in the said plate and afterward upset. The sides of this housing 14 are slotted, as shown at 16 16, to receive the lower bar of a loop 17, which has upright side bars which pass up outside of the two housings 14 and 4, and an outwardly-inclined cross-bar 18 at the top for engagement with the described catch 9 on the slide-block 7 in the upper housing 4 when the device is locked. The lower bar of the said loop 17 has an upward central extension 19, formed with two holes therethrough for the reception of the two arms of a U-shaped spring 20. The ends of these spring-arms bear against the lower part of a leaf-spring 21, whose upper end is held in a transverse notch 22 in the upper part of the said housing 14, the lower end of this leaf-spring 21 being held between the casing 14 and plate 2.

The operation of my device will be readily understood from the foregoing description of its construction, taken in connection with the accompanying drawings, in which the several views show the parts in the closed position. If it is desired to open the receptacle, pressure is applied to the thumb-piece 11, and thereby the slide-block 7 forced downward, and as the upper end of the catch 9 on said block is depressed below the line of the loop-bar 18 the said loop 17 will be thrown outward by the force of the described springs 20 and 21. To close and fasten the device, the loop 17 is pushed inward, and the lower edge of the bar 18 will ride over the catch 9, depressing same slightly against the force of the spring 6, and as soon as the edge of said loop-bar moves beyond the top of the catch the said spring will act and raise the slide-block 7, thus locking the parts, as best shown in Fig. 2.

Having thus described my invention, what I claim as new, and desire to secure by Letters Patent, is—

1. In a spring-fastener, the combination with upper and lower plates, each having a housing attached thereto, of a fastening-loop pivotally secured to one of said housings and arranged to move over the other, a spring-actuated slide-block movable in one of said housings and provided with a loop-engaging catch, and a thumb-piece for releasing said engagement; a leaf-spring in the other housing and another spring connected to said loop and engaging with said leaf-spring for throwing said loop outward, on its disengagement from said catch.

2. In a spring-fastener, the combination with upper and lower plates, each having a housing attached thereto, of a fastening-loop, having upright side bars passing up outside of the two housings, a lower cross-bar pivotally secured to the lower housing, and having an upward central perforated extension, and an upper outwardly-inclined cross-bar; a spring-actuated slide-block movable in the upper housing, and formed with a catch for engagement with said outwardly-inclined cross-bar; a leaf-spring in the lower housing, and another spring having arms passing through the perforations in the central extension of the lower bar of the fastening-loop and bearing against said leaf-spring.

3. In a spring-fastener, the combination with upper and lower plates, each having a housing attached thereto, the upper housing being open at the top, and closed by a bottom plate, and the upper plate having a vertical slot therein, of a spiral spring resting on said bottom plate of the upper housing; a vertically-moving slide-block formed with a depending central lug fitting within the coils of said spring, and with an upward-projecting catch; a shank projecting upwardly from said slide-block and provided with a rear guide-lug having movement in the slot in the upper plate and with an outward-projecting upper thumb-piece; a fastening-loop pivotally secured to the lower housing, and adapted to engage with the catch of the slide-block; a leaf-spring in the lower housing, and another spring connected to the fastening-loop and bearing against said leaf-spring.

In testimony that I claim the foregoing I have hereunto set my hand, at Milwaukee, in the county of Milwaukee and State of Wisconsin, in the presence of two witnesses.

EUGENE W. HAWLEY.

Witnesses:
  H. G. UNDERWOOD,
  N. E. OLIPHANT.